Figure 3:
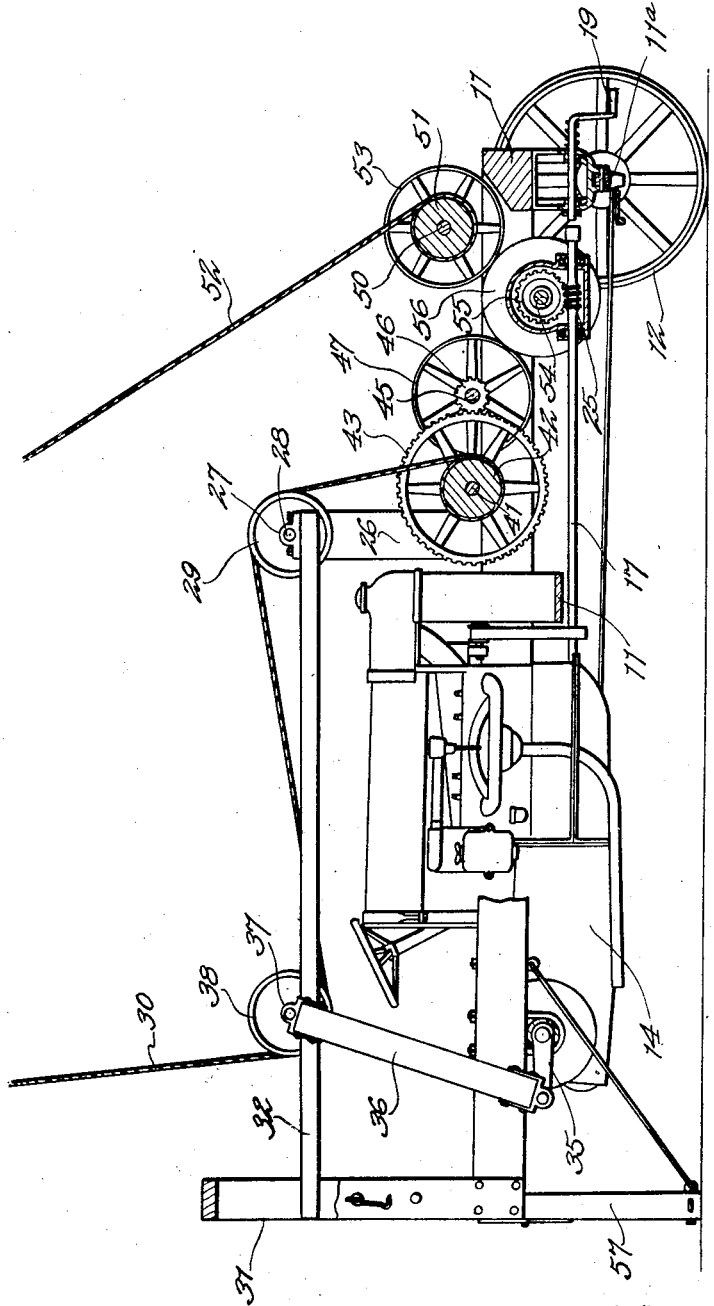

July 14, 1925.

W. R. COX

TRACTOR AND PORTABLE DRILLING MACHINE

Filed March 19, 1924    3 Sheets-Sheet 1

1,546,207

William R. Cox
INVENTOR

BY Victor J. Evans
ATTORNEY

WITNESSES:—

July 14, 1925.  
W. R. COX  
1,546,207  
TRACTOR AND PORTABLE DRILLING MACHINE  
Filed March 19. 1924     3 Sheets-Sheet 2
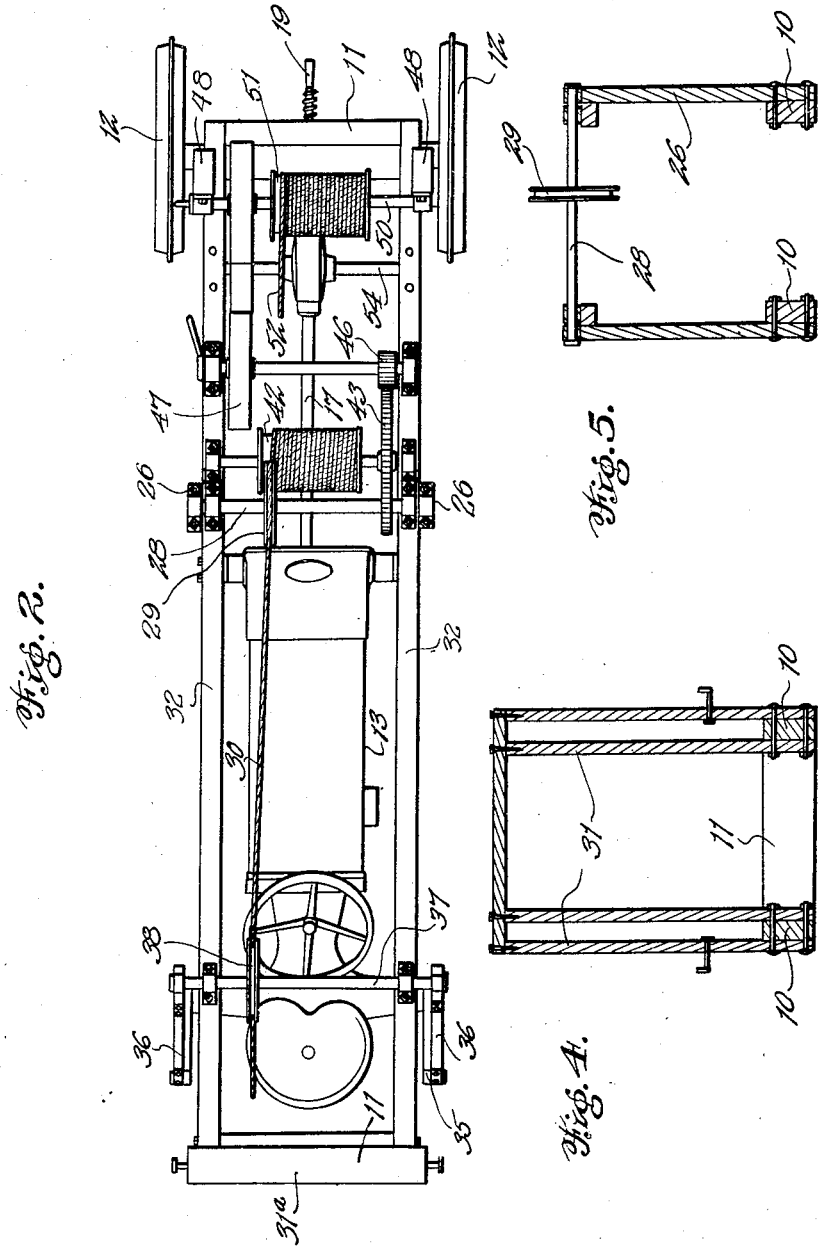
William R. Cox
INVENTOR
BY Victor J. Evans
ATTORNEY
WITNESSES:—

July 14, 1925.  1,546,207

W. R. COX

TRACTOR AND PORTABLE DRILLING MACHINE

Filed March 19, 1924  3 Sheets-Sheet 3

Inventor
William R. Cox
By Victor J. Evans
Attorney

Patented July 14, 1925.

1,546,207

UNITED STATES PATENT OFFICE.

WILLIAM R. COX, OF BAIRD, TEXAS.

TRACTOR AND PORTABLE DRILLING MACHINE.

Application filed March 19, 1924. Serial No. 700,365.

*To all whom it may concern:*

Be it known that I, WILLIAM R. Cox, a citizen of the United States, residing at Baird, in the county of Callahan and State of Texas, have invented new and useful Improvements in Tractor and Portable Drilling Machines, of which the following is a specification.

This invention relates to drilling rigs and has for its object the provision of a tractor type or portable machine for drilling oil or other wells, cleaning them, fishing for broken rods, pulling tubing and other similar purposes, the main feature being the elimination of the usual pulley and belt drive mechanism which is replaced by a worm drive throughout whereby slippage and other disadvantages of the well known mechanism will be avoided and positive action assured.

An important object is the provision of a device of this character which may be propelled under its own power from place to place where its services are needed and which will therefore be more convenient to use than the ordinary type.

An additional object is the provision of a drilling rig which will be simple and inexpensive to manufacture, easy to control and operate, positive in action, efficient and durable in service and a general improvement in the art.

With the above and other objects and advantages in view the invention consists in the details of construction to be hereinafter more fully described and claimed and illustrated in the accompanying drawings, in which:

Figure 1 is a side elevation of the device with the driving wheel in operative position, Figure 2 is a top plan view, Figure 3 is a longitudinal section with the tractor wheel removed and showing the device ready for drilling, Figures 4 and 5 are cross sections on the lines 4—4 and 5—5, respectively, of Fig. 1.

Fig. 6 is a detail view of the transmission mechanism.

Referring more particularly to the drawings I have shown the device as comprising a supporting frame including longitudinal sills 10 connected by any suitable number of cross bars 11. Any desired axle structure 11a may be provided for supporting this frame upon ground engaging front wheels 12 so that the device may be transported easily from place to place. Any suitable steering mechanism is provided for these front wheels. The sills are so constructed as to support an engine 13 of a well known tractor type, which engine includes a combined crank and transmission case 14, a radiator 15 and a gasoline tank 16.

Extending longitudinally through the crank and transmission case 14 is a drive shaft 17 having crank portions 18 connected with the engine pistons in the usual manner. This shaft is of sufficient length to extend to the front of the frame where it is equipped with the usual crank 19 for effecting starting of the engine. The shaft also is equipped with a clutch device 20 and transmission gears 21 engaging other gears 22 on a shaft 23 carrying a worm 24. The forward portion of the shaft 17 carries a worm 25. The non-essential details of the casing and engine construction are not illustrated as they are well known and as they may be changed within comparatively wide limits as may be found necessary or advisable in the actual construction of the machine.

Rising from the central portion of the frame are posts 26 carrying bearings 27 for the shaft 28 of a pulley 29 for the drilling cable 30. Rising from the rear end of the frame are samson posts 31 connected by a cross member 31a. Carried by the shaft 28 and operating between the samson posts is the spudding beam 32.

At the rear end of the combined casing 14 is journaled a shaft 33 carrying a worm wheel 34 meshing with the worm 24. This shaft carries a crank arm 35 to which may be bolted a removable traction wheel 35a when the machine is to be moved or to which is connected the lower end of the drilling pitman 36 when the machine is to be used. The pitman 36 carries a shaft 37 located above the spudding beam 32 and equipped with a pulley 38 about which is trained the drilling cable 30 above described. Any suitable truss rods 39 may be provided for bracing the rear portion of the structure.

Carried by the sills in advance of the post 26 are suitable bearings 40 on a shaft 41 carrying the usual drilling line drum 42 and also carrying a large spur gear 43. On the sills are other bearings 44 for a shaft 45 equipped with a spur pinion 46 meshing with the gear 43, and further equipped with a friction pulley 47.

At the front end of the frame are posts or standards 48 carrying bearings 49 for a shaft 50 carrying a bailer line drum 51 for the bailer cable 52. This shaft is also equipped with a friction pulley 53.

Suitably journaled below the sills near their front ends is a counter-shaft 54 carrying a worm wheel 55 meshing with the worm 25, and also carrying a fiber friction pulley 56 which engages both of the pulleys 47 and 53.

When the device is to be moved about from place to place, the wheel 35ª is bolted onto the arm 35 and then acts as a traction wheel, power being applied to the worm gearing above described. When the device has been moved to a point where its operation is desired, the wheel 35ª is removed and the pitman 36 bolted onto the arm 35. To take the place of the wheel I provide a support 57 adapted to be engaged beneath the rear end of the frame for holding it at the proper height, which would naturally be the same as its height when the wheel is in place.

In the operation it will be apparent that the drilling cable and drum device together with the drilling pitman are all operated without the employment of any belts and pulleys, the drive being effected purely by the worm and worm wheel arrangement disclosed, a structure which is bound to be more efficient than the ordinary type inasmuch as slippage and other disadvantages will be avoided, the action being certain and definite at all times.

The device is readily portable by bolting on the wheel 35ª so that it may be under its own power when moved from place to place wherever its use is desired. Obviously the machine need not be restricted in its use for drilling purposes, as it is capable of employment for many other operations incidental to the drilling, cleaning or other treatment of oil or other wells.

While I have shown and described the preferred embodiment of my invention it is of course to be understood that I reserve the right to make such changes in the form, construction and arrangement of parts as will not depart from the spirit of the invention or the scope of the subjoined claim.

I claim:

In a machine of the character described, a frame having front wheels equipped with steering means, a motor on the frame, a shaft driven by the motor, a transverse shaft at the rear end of the machine having a worm driven connection with said first named shaft and carrying a crank arm, drilling mechanism on the frame adapted to be operated by said crank arm and including a pitman connectable therewith, and a traction wheel adapted to be bolted onto said crank arm subsequent to the disconnection of the pitman therefrom whereby the entire device may be propelled under its own power.

In testimony whereof I affix my signature.

WILLIAM R. COX.